United States Patent [19]
Keaton

[11] 3,831,958
[45] Aug. 27, 1974

[54] COLLAPSIBLE CART
[76] Inventor: Morgan G. Keaton, 507 Potrero Ave., San Francisco, Calif. 94110
[22] Filed: Jan. 2, 1973
[21] Appl. No.: 320,239

[52] U.S. Cl............. 280/36 C, 280/42, 280/DIG. 6
[51] Int. Cl............................................. B62b 11/00
[58] Field of Search......... 280/36 C, 42, 38, DIG. 6, 280/41 C, 41 D, 47.26

[56] References Cited
UNITED STATES PATENTS
| | | | |
|---|---|---|---|
| 2,422,298 | 6/1947 | Freis | 280/42 |
| 2,619,360 | 11/1952 | Alter | 280/42 |
| 2,756,064 | 7/1956 | Rutledge | 280/41 D |

Primary Examiner—Robert R. Song
Attorney, Agent, or Firm—Townsend and Townsend

[57] ABSTRACT

An improved two-wheeled cart capable of supporting and moving a bag, box or other similar article. The cart has a collapsible frame formed of a pair of lower, angled members pivotally connected at their normally upper ends to the normally lower end of a third member so that the members provide an inverted Y-shaped configuration for the frame when the latter is in an operative condition. Means is provided to releasably hold the frame in such operative condition. A pair of wheels are carried at the normally lower ends of the lower members by a pair of brackets, to each of which is pivotally connected an article-supporting rail. The rails extend inwardly toward each other and their inner ends are interconnected by pivot pins so that the rails from a collapsible rail assembly responsive to the collapsing of the frame. The rails are positioned over-center when they are in their operative locations so as to stabilize the cart and hold the wheels apart. Stop means is provided near the inner ends of the rails to limit their downward path of travel as they move into their operative locations.

13 Claims, 9 Drawing Figures

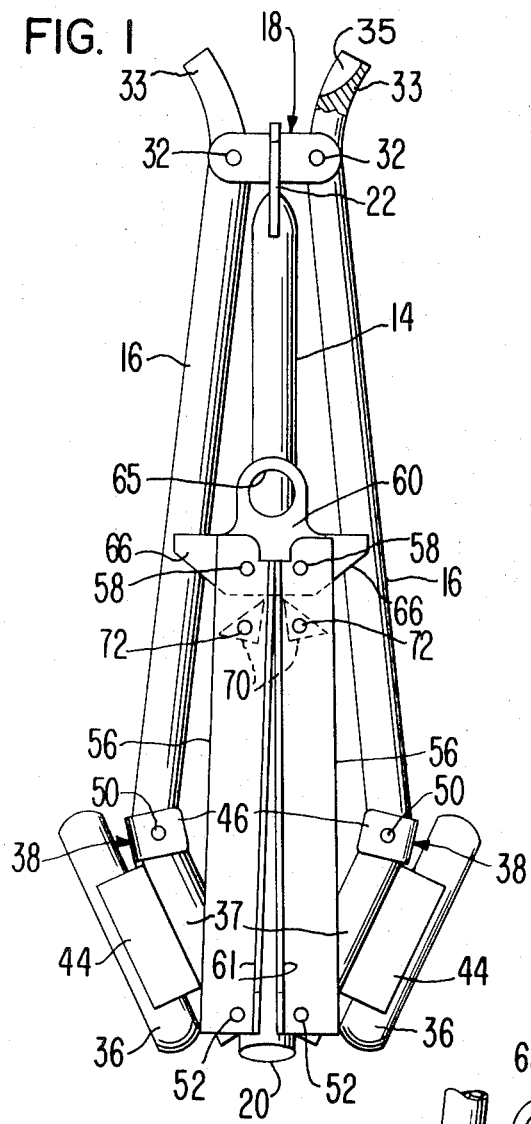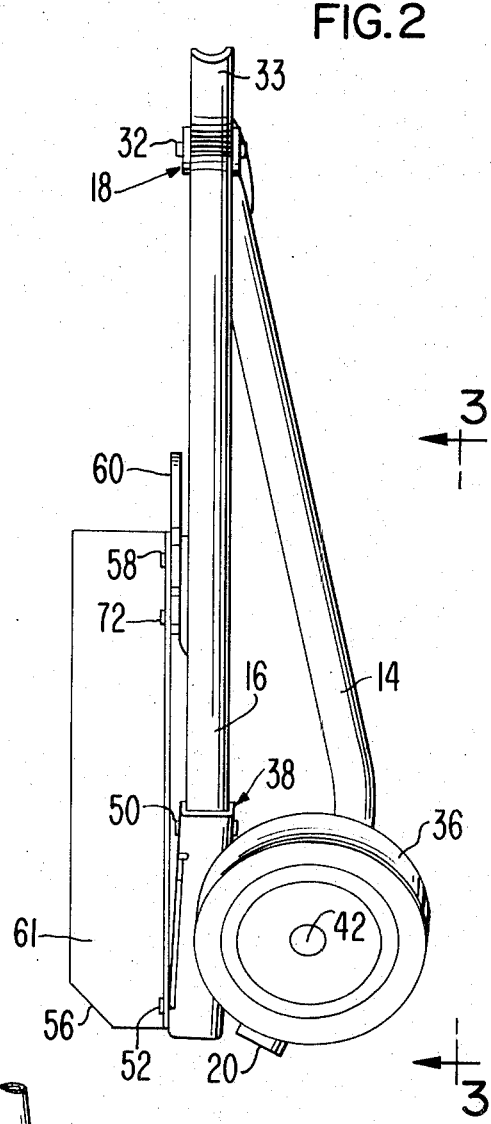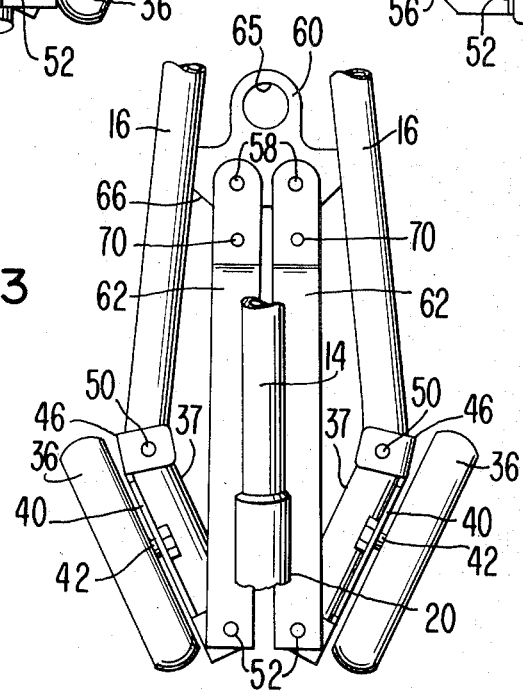

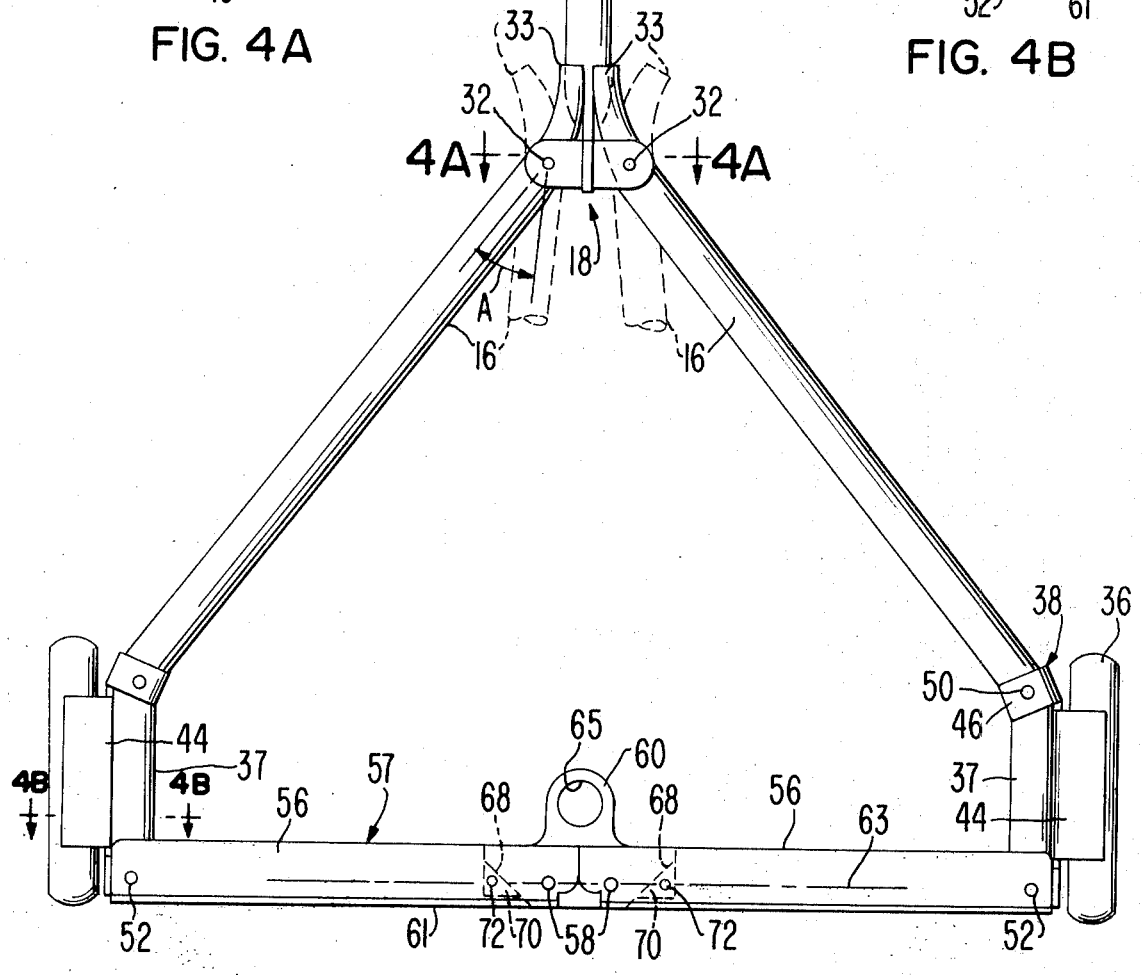

PATENTED AUG 27 1974  3,831,958

COLLAPSIBLE CART

This invention relates to improvements in two-wheeled carts and, more particularly, to a collapsible cart suitable for supporting and moving bags, boxes or the like.

BACKGROUND OF THE PRIOR ART

Collapsible, two-wheeled carts have been used in the past to support and move loads, such as boxes, bags and other articles. For the most part, such carts have been used primarily to support and move golf bags. Typical carts are disclosed in U.S. Pat. Nos. 2,756,064; 2,810,586; 2,837,346; 3,400,943; and 3,204,976. All of these carts are constructed for use only with long, narrow bags. As a result, the bag support on a cart of this type is relatively narrow in width and is fixed to the frame of the cart and is not collapsible since there is no need for it to collapse because of its narrow width. When a conventional golf cart is collapsed, it still is relatively long in length and cumbersome to handle.

SUMMARY OF THE INVENTION

The present invention is directed to an improved, collapsible two-wheeled cart which is simpler in construction than conventional carts of this type yet is sufficiently rugged and is of a size to support and transport relatively large loads in the form of relatively wide bags, boxes or other similar articles. To this end, the cart of this invention is comprised of a simple frame including three elongated, lightweight members which, when the cart is extended in its operative condition, form an inverted Y-shaped configuration defined by an upper, single member releasable secured to the upper ends of a pair of inclined lower members which diverge as their lower extremities are approached. A pair of wheels are secured to the lower ends of the lower members and are held apart by a collapsible rail formed of two sections which extend inwardly from the lower ends of the lower members and are pivotally interconnected at their inner ends by bridging member having rail stop means thereon. The stop means serves to limit movement of the rails in one direction as they extend inwardly from the wheels and into slightly overcentered positions to stabilize the cart and to keep the wheels separated. The rail sections also have means thereon for supporting an article to be carried and moved by the cart. Moreover, the cart can be easily and quickly collapsed with the lower side members and the rail sections adjacent to each other, with the upper member swung into a downwardly extending position nested closely with the other two members and with the wheels adjacent to each other, thereby forming a compact unit which can be stored in a minimum of space.

The primary object of this invention, therefore, is to provide an improved collapsible cart having a collapsible frame, a pair of spaced wheels on the lower extremities of the frame, and a collapsible, article-supporting rail extending between the wheels so that the frame and the rail can be used to support relatively wide loads, such as bags, boxes and other such articles, as the wheels engage and move over a supporting surface.

A further object of this invention is to provide a cart of the aforesaid character wherein the rail has two relatively shiftable parts pivoted to the lower extremities of the frame and move into alignment with each other and into overcenter positions when the cart is placed in an operative condition so that the rail not only cooperates with certain parts of the frame to support an article to be moved but also the rail holds the wheels apart and prevents accidental collapse of the cart.

Another object of this invention is to provide a cart of the type described which is constructed of a minimum of light-weight, inexpensive parts and which can be quickly assembled and disassembled yet can be readily stored in a minimum space.

Other objects of this invention will become apparent as the following specification progresses, reference being had to the accompanying drawings for an illustration of the invention.

In the drawings:

FIG. 1 is a front elevational view of the cart of the present invention, showing it in its collapsed condition;

FIG. 2 is a side elevational view of the collapsed cart;

FIG. 3 is a fragmentary, rear elevational view of the cart looking in the direction of line 3—3 of FIG. 2;

FIG. 4 is a front elevational view of the cart in its operative condition;

FIG. 4a is a cross-sectional view taken along line 4a—4a of FIG. 4;

FIG. 4b is a cross-sectional view taken along line 4b—4b of FIG. 4;

Figure 5:
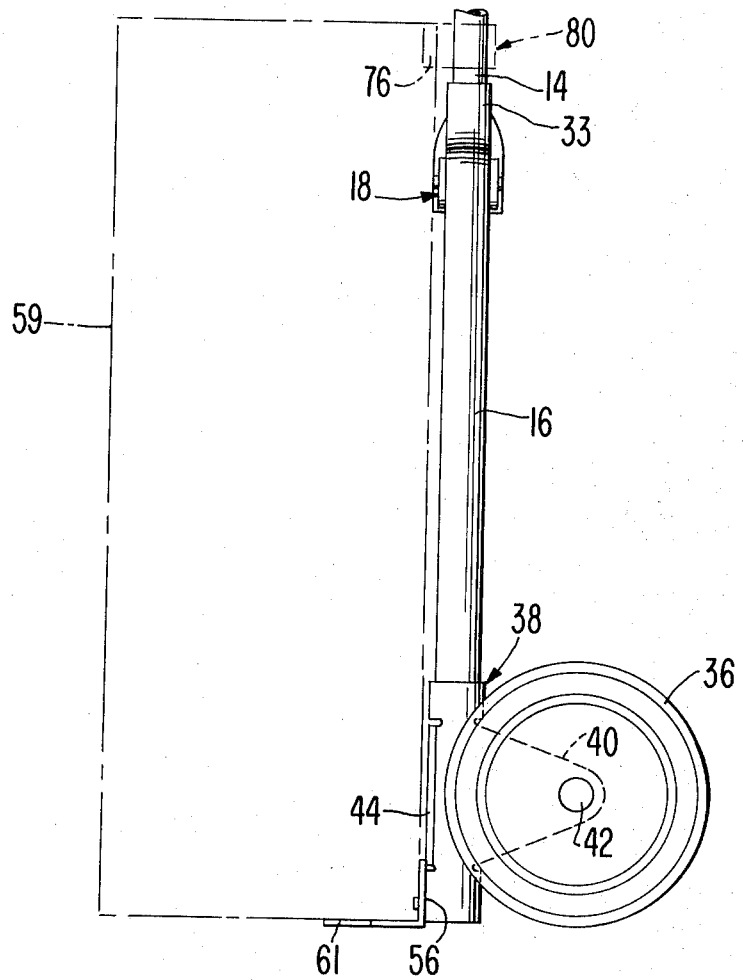
FIG. 5 is a fragmentary, side elevational view of the cart in its operative condition.

The cart of the present invention is broadly denoted by the numeral 10 and includes a collapsible frame 12 having a first, elongated, normally upper member 14 and a pair of second, lower, normally inclined members 16. Pivot means 18 pivotally couple members 14 and 16 together in a manner to permit frame 12 to be moved from its collapsed condition (FIGS. 1-3) to its extended or operative condition (FIGS. 4 and 5) in which the frame has an inverted Y-shaped configuration (FIG. 4). Member 14 preferably has an angled, upper end segment 19 provided with a handgrip 20 thereon. Members 14 and 16 are preferably tubular and of a lightweight material, such as aluminum or the like, to minimize the weight of the cart. Also, the lengths of members 14 and 16 are such that handgrip 20 is at a convenient height to permit the user of the cart to comfortably grip the same and move the cart forwardly or rearwardly.

Figure 7:
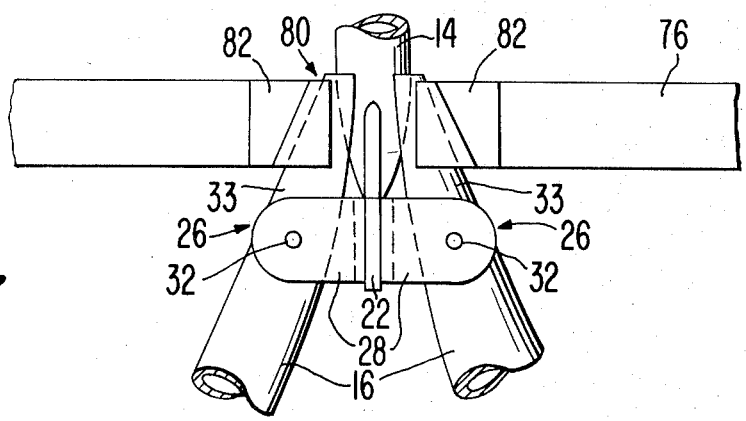
FIG. 7 is a fragmentary, enlarged front elevational view of a portion of the cart showing the bag-supporting bar thereon.

The lower end of member 14 has a flattened portion 22 which is symmetrical with the longitudinal axis of the member and is centrally disposed relative thereto as shown in FIGS. 4 and 7. Portion 22 has a pair of opposed, flat faces 24.

Pivot means 18 includes a pair of spaced U-shaped brackets 26 on opposite sides of portion 22 and closely adjacent thereto. Each bracket 26 has a flat bight 28, the two bights being in alignment with each other (FIG. 4a) and spaced apart sufficiently to permit portion 22 to pivot therebetween and relative thereto about a pin 30 spanning the distance between and carried by bights 28. Pin 30 is centrally disposed relative to the bights and terminates adjacent to the inner surface of respective bights (FIG. 4a) so that the brackets can receive respective members 16 between the sides 31 thereof and members 16 can be pivotally connected by respective pins 32 to sides 31 of corresponding brackets 26.

Pins 32 extend transversely of pin 30; however, the three pins are generally disposed in the same plane. Pins 32 are spaced sufficiently far from respective bights to allow the upper end portions 33 of members 16 to be pivoted from innermost positions (FIG. 4) at which frame 12 is in its operative condition to outermost positions (FIG. 1) at which the frame is in its collapsed condition. FIG. 4 shows the collapsed positions of members 16 partially in dashed lines and illustrates that each member 16 pivots through an acute angle A as it moves from its extended position to its collapsed position.

Upper end portion 33 (FIG. 1) of each member 16 is transversely crescent-shaped to present a recess having a semicylindrical inner surface 35 which is substantially complemental to the cylindrical outer surface of member 14 adjacent to portion 22 thereof. Thus, when frame 12 is in its operative condition (FIG. 4), upper end portions 33 partially embrace the opposed, adjacent sides of member 14 and releasably hold the latter so as to prevent it from pivoting about pin 30. When members 16 move into their collapsed positions (FIG. 1), member 14 is free to pivot about pin 30 in a clockwise sense when viewing FIG. 2. Thus, member 14 can pivot into its collapsed position (FIGS. 1–3), extending downwardly and away from the plane of members 16 with handgrip 20 being adjacent to the normally lowermost extremities of members 16 (FIG. 3). When frame 12 is in its operative condition (FIGS. 4 and 5), member 14 is substantially disposed in the plane of members 16 as shown in FIG. 5.

Each member 16 is provided with a wheel 36 at the normally lowermost extremity thereof. A bracket 38 couples each wheel 36 to a lower segment 37 of the corresponding member 16, each segment 37 being at an angle to but in the same plane as the major portion of the corresponding member 16.

Each bracket 38 includes a plate 40 (FIGS. 4b and 5) having a hole for receiving an axle 42 of the corresponding wheel 36. Means is provided to couple axle 42 in any suitable manner to plate 40, the axle being normally rearwardly of and spaced from the adjacent segment 37. Bracket 38 also has a flat front, lateral extension 44 immediately forwardly of the plane of members 16 (FIG. 5), an upper U-shaped part 46, and a lower U-shaped part 48. Extension 44 and parts 46 and 48 are integral with plate 40. Part 46 is inclined (FIG. 4) relative to the plane of plate 40; whereas, part 48 has a pair of opposed sides which are perpendicular to the plate. The opposed sides of part 46 embrace the junction of the corresponding member 16 and its segment 37 and are connected to such junction by a pin 50. The opposed sides of part 48 embrace the normally lower end of the corresponding segment 37 and are connected thereto by a pin 52. Thus, brackets 38 secure wheels 36 to respective segments 37 at locations in which the wheels are slightly outboard and rearwardly of the segments (FIGS. 1, 3 and 4).

A pair of transversely L-shaped support rails 56 of equal length are pivotally connected at normally outer ends thereof by respective pins 52 to the lower front ends of segment 37. Rails 56 extend inwardly from respective segments 37 toward each other when frame 12 is in its operative condition and are pivotally interconnected by a pair of spaced pins 58 (FIGS. 1, 3 and 4) carried by a bridging member 60 comprising a plate having a hole 65 therethrough. Rails 56 thus form a collapsible rail assembly 57 whose collapsing action is responsive to that of frame 12.

Rail assembly 57 has a dual function: it serves to keep wheels 36 apart when frame 12 is in its operative position; and, because of its L-shape and its proximity to the plane of members 16, it provides a support for an article 59 (FIG. 5) to be moved by cart 10. To provide an article support, each rail 56 has a forwardly extending flange 61, (FIGS. 2 and 5) on which the article rests.

A pair of rear braces 62 (FIGS. 3) are provided behind respective rails 56. The outer ends of braces 62 are pivotally connected by pins 52 to adjacent segments 37 and the inner ends of the braces are pivotally coupled by pins 58 to member 60. Braces 62 stabilize rail assembly 57 and strengthen the beam formed thereby when the rail assembly is in its operative position (FIG. 4).

Bridging member 60 has a pair of lower, inclined side margins 66 (FIGS. 1, 3 and 4) which converge toward each other as the lower extremity of member 60 is approached. Margins 66 are positioned to move into engagement with respective inclined surfaces 68 on a pair of triangular elements 70 rigidly secured by pins 72 between respective pairs of rails 56 on braces 62. Elements 70 thereby serve as stops to limit the pivotal movement of respective rails 56 relative to bridging member 60. Also, elements 70 are disposed so that the rails are overcenter when they are in their operative positions (FIG. 4), ie., pins 58 are slightly below a line 63 (FIG. 4) passing through pins 52.

Figure 6:
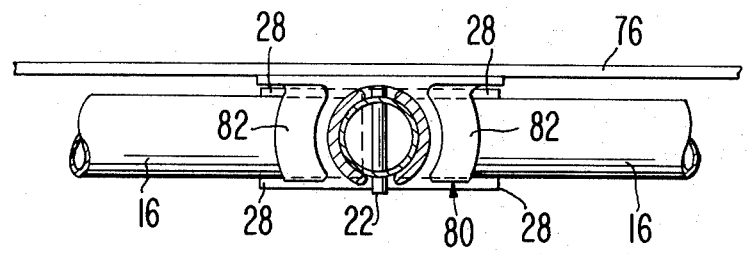
FIG. 6 is a fragmentary, enlarged horizontal, cross section of the cart having a bag-supporting bar releasably mounted thereon near the midpoint thereof.

Cart 10, for purposes of illustration, is to be used with a canvas bag represented by article 59 (FIG. 5). The bag has an upper, normally horizontal rigid bar 76 secured in any suitable manner to it and the bar has a bracket 80 centrally located thereon. The clip has an open end and a pair of spaced, opposed, resilient sides 82 which are curved as shown in FIG. 6. Sides 82 are adapted to partially embrace opposed sides of member 14 above portion 22 thereof (FIG. 5). This feature provides for releasably coupling the upper extremity of the bag to the cart while the lower extremity or bottom of the bag is resting on flanges 61 of rails 56. In the alternative, sides 82 of clip 80 could embrace upper end portions 33 of members 16 (FIG. 7) to thereby releasably hold portions 33 against member 14.

In use, and assuming cart 10 is in its collapsed condition (FIGS. 1–3), it is assembled by pivoting member 14 upwardly about pin 30 in a counterclockwise sense when viewing FIG. 2 until it is aligned with and disposed between upper end portions 33 of member 16. Then, wheels 36 are manually moved apart, causing upper end portions 33 to move toward each other and into engagement with opposed sides of member 14 to thereby hold the same against pivotal movement about pin 30. As upper end portions 33 move toward each other, segments 37 of members 16 move apart and, when this occurs, rail assembly 57 straightens out and moves into the position of FIG. 4 where pins 58 are below line 63 to cause the rails 56 to be slightly overcenter to thereby hold wheels 36 apart. Then, bag 59 is placed on flange 61 and clip 80 is forced onto member 14 (FIG. 6), or, if clip 80 is so constructed, it is forced onto upper end portions 33 (FIG. 7). Then, the cart is tilted rearwardly so that wheels 36 move into rolling engagement with the supporting surface therebelow and the cart and bag can be moved over such surface. When frame 12 is upright as shown in FIG. 5, wheels 36 are out of substantial rolling engagement with the supporting surface.

When it is desired to remove the bag, clip 80 is manually forced away from member 14, then the bag is lifted off flange 61. To collapse cart 10, bridging member 60 is elevated by inserting the finger into hole 65 and lifting, thereby causing rails 56 and braces 62 to be moved upwardly and to pull wheels 36 inwardly toward each other. This causes end portions 33 of members 16 to separate. Then, member 14 is pivoted in a clockwise sense when viewing FIG. 2 into its nested or collapsed position. The cart is then in a compact configuration and can be stored in a minimum of space.

I claim:

1. A collapsible, two-wheeled cart comprising:
a collapsible frame movable from an operative condition to a collapsed condition, said frame including a first member and a pair of second members, the members forming an inverted Y-shaped configuration when the frame is in its operative condition and forming a compact bundle when the frame is in its collapsed condition; pivot means interconnecting proximal ends of the members to permit the frame to be moved from said operative condition to said collapsed condition wherein the distal end of said first member is adjacent the distal ends of said second members and return, said pivot means including a support, a pair of spaced, parallel first pins carried by the support, the proximal ends of the second members being pivotally mounted on respective first pins, and a second pin carried by the support and extending transversely to the first pins, said first member being pivotally mounted on the second pin for pivotal movement in a plane transverse to the plane of the second members; means on said second members for releasably holding the first member in an outwardly extending position relative thereto when said frame is in said operative condition; a wheel for each second member, respectively, the wheels being mounted on the opposite ends of respective second members for rotation relative thereto about a common axis; a collapsible, article-supporting rail assembly; and means pivotally mounting said rail assembly on said second members at a location permitting the rail assembly to move into an operative position extending between said wheels and to thereby hold the same in spaced apart, ground-engageable relationship to each other when the frame is in said operative condition, said rail assembly being collapsed in response to the collapsing of the frame.

2. A cart as set forth in claim 1, wherein said rail assembly comprises a pair of transversely L-shaped rails, each rail having an article-supporting flange, the flanges of the rails being in alignment with each other when said rail assembly is in its operative position.

3. A cart as set forth in claim 1, wherein is provided a bracket for each wheel, respectively, each bracket having a plate secured to and extending laterally from the corresponding second member near the opposite end thereof, each wheel having an axle secured to the corresponding plate in laterally spaced relationship to the corresponding second member.

4. A cart as set forth in claim 1, wherein the second members remain coplanar with each other as the frame is moved from its operative condition to its collapsed condition.

5. A cart as set forth in claim 1, wherein said support comprises a pair of U-shaped brackets, each bracket having a bight, the bights being spaced apart and adjacent to each other, the first member having a flattened portion between the bights, the second pin extending between the bights and through the flattened portion.

6. A cart as set forth in claim 1, wherein said holding means includes an end portion for the proximal end of each second member, respectively, each end portion having an inner surface substantially complemental to a portion of the outer surface of the first member, the end portions being movable into partially embracing relationship to the first member when the frame moves into its operative condition, whereby the first member is held against movement relative to the second members.

7. A cart as set forth in claim 1, wherein said rail assembly comprises a pair of rails, one end of each rail being pivotally mounted to the opposite end of the corresponding second member, and means pivotally interconnecting the opposite ends of the rails, the latter being movable from positions aligned with each other when the frame is in its operative condition to generally side-by-side positions when the frame is in the collapsed condition.

8. A cart as set forth in claim 7, wherein is included stop means on the rails for engaging the interconnecting means to prevent the pivotal movement of each rail in one direction when said rail assembly is in said operative position.

9. A cart as set forth in claim 8, wherein said interconnecting means is coupled to the rails at a location causing the rails to be in overcentered conditions with respect to their pivotal connections with corresponding second members to thereby stabilize the cart.

10. A cart as set forth in claim 7, wherein said stop means comprises an element carried by each rail, respectively, and having a side margin, said interconnecting means including a bridging member having a pair of spaced pivot pins pivotally connecting the same to respective rails, said bridging member having a pair of relatively convergent end margins movable into engagement with the side margins of respective elements as the rail assembly moves into said operative position.

11. A cart as set forth in claim 10, wherein the bridging element has a loop thereon defining a finger-receiving opening.

12. A cart as set forth in claim 1, wherein each second member has an outer end segment thereon, the segment being disposed at an angle with respect to the major portion of the corresponding second member, the rail assembly being pivotally connected to the end segments and extending therebetween when the frame is in said operative condition, said common axis being laterally spaced from the segments and being generally parallel to the rail assembly when the latter is in its operative position.

13. A collapsible, two-wheeled cart comprising: a collapsible frame including a normally upper member and a pair of normally lower members; means pivotally mounting the upper ends of the lower members on the lower end of the upper member to permit the lower members to pivot through limited arcs toward and away from each other in a plane about a pair of parallel axes perpendicular to the frame and to permit the upper member to pivot about an axis in said plane from a first position at which the upper member forms an inverted Y-shaped configuration with the lower members to a second position at which the upper member extends downwardly and outwardly from the lower members to form therewith a collapsed bundle; a pair of L-shaped rails, one end of each rail being pivotally mounted on the lower end of a corresponding lower member and extending toward the other lower member, the opposite ends of the rails being adjacent to each other when the lower ends of the lower members are remote from each other; a bridging member adjacent to the opposite ends of the rails; a pin pivotally interconnecting the bridging member and the outer end of each rail, respectively, to permit the rails to move from aligned, end-to-end positions when the lower ends of the lower members are remote from each other to upright, side-by-side positions when said lower ends are adjacent to each other; a brace for each rail, respectively, said braces extending between and pivotally connected to the lower ends of respective lower members and the bridging member, the braces being movable with respective rails; stop means between each rail and the adjacent brace for engaging the bridging member to limit movement of the rails as they move into alignment with each other with the stop means being disposed to permit the rails to be overcenter with respect to their pivotal connections to the lower members, whereby the lower ends of the lower members are kept spaced apart; a wheel for each lower end of each lower member, respectively; and means mounting each wheel on the lower end of the corresponding lower member at a location permitting the wheel to rotate about an axis spaced laterally from said lower end and with the wheel being outboard thereof, said wheels being out of substantial rolling engagement with a supporting surface therebelow when the plane of the lower members is substantially vertical.

* * * * *